United States Patent [19]

Hespelt et al.

[11] Patent Number: 4,705,292
[45] Date of Patent: Nov. 10, 1987

[54] INDEPENDENT WHEEL SUSPENSION FOR STEERABLE WHEELS OF MOTOR VEHICLES

[75] Inventors: Achim Hespelt; Manfred v. d. Ohe, both of Stuttgart, Fed. Rep. of Germany

[73] Assignee: Daimler-Benz Aktiengesellschaft, Stuttgart, Fed. Rep. of Germany

[21] Appl. No.: 839,598

[22] Filed: Mar. 14, 1986

[30] Foreign Application Priority Data

Mar. 14, 1985 [DE] Fed. Rep. of Germany ....... 3509145

[51] Int. Cl.$^4$ .............................................. B60G 3/20
[52] U.S. Cl. .................................... 280/660; 280/691
[58] Field of Search ............... 280/668, 771, 93, 96.1, 280/660, 663, 666, 673, 675, 691-696

[56] References Cited

U.S. PATENT DOCUMENTS 4,145,072  3/1979  Matschinsky ........................ 280/668
4,440,420  4/1984  Muller ................................. 280/660

FOREIGN PATENT DOCUMENTS 1938851  8/1970  Fed. Rep. of Germany ...... 280/660

OTHER PUBLICATIONS

ATZ Automobile Magazine (Germany, 1977), pp. 357-365.

Primary Examiner—David M. Mitchell
Assistant Examiner—Everett G. Diederiks, Jr.
Attorney, Agent, or Firm—Barnes & Thornburg

[57] ABSTRACT

An independent wheel suspension for steerable wheels has a wheel bearer connected to the vehicle body and first and second guide wheel members. The first guide wheel member comprises separate guide links coupled at articulated points to the vehicle body and to the wheel bearer, and a coupler connected between the articulated points at the wheel bearer. The coupler transverses a bisector of an angle formed by the guide links and is angled rearwardly and inwardly from the wheel. This wheel suspension enables the castor distance to be increased at the wheel in a curve during wheel turning, while maintaining a specified basic arrangement for the guide links.

5 Claims, 6 Drawing Figures

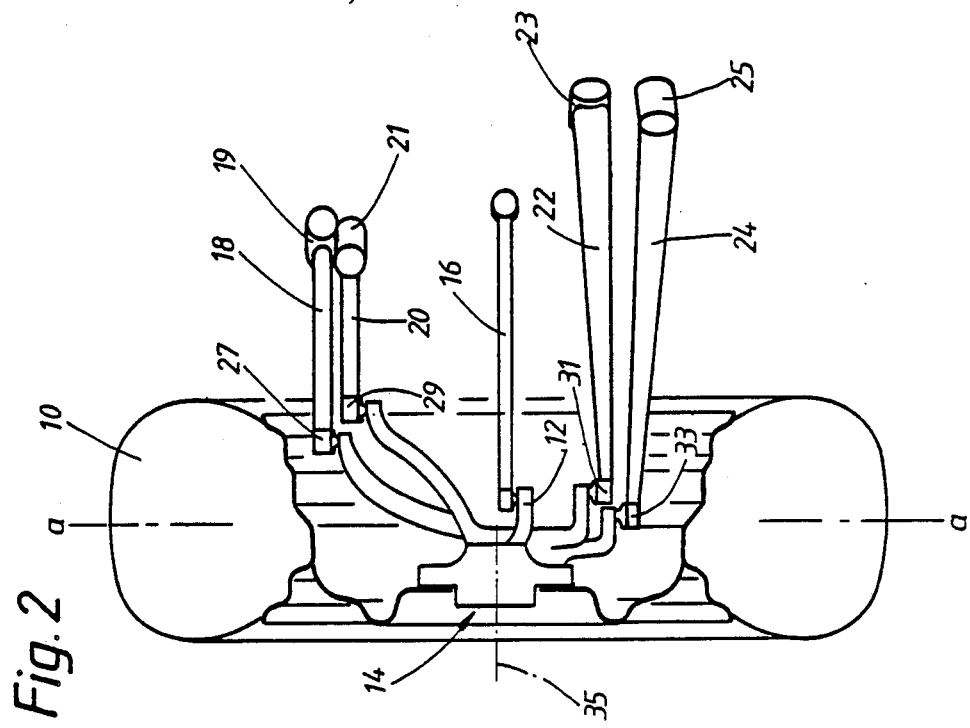
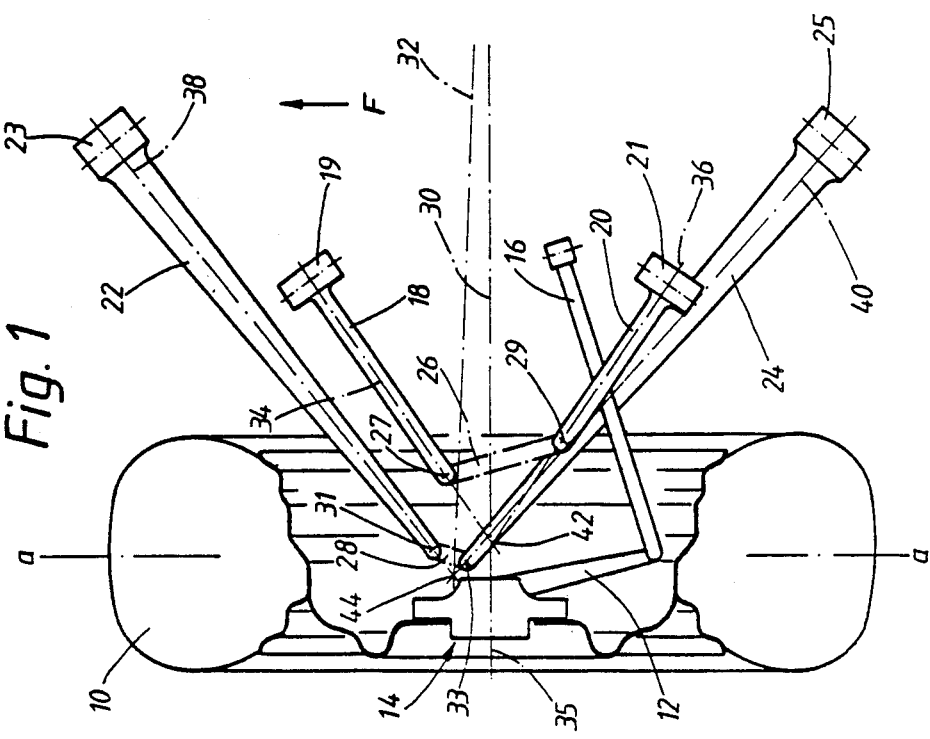

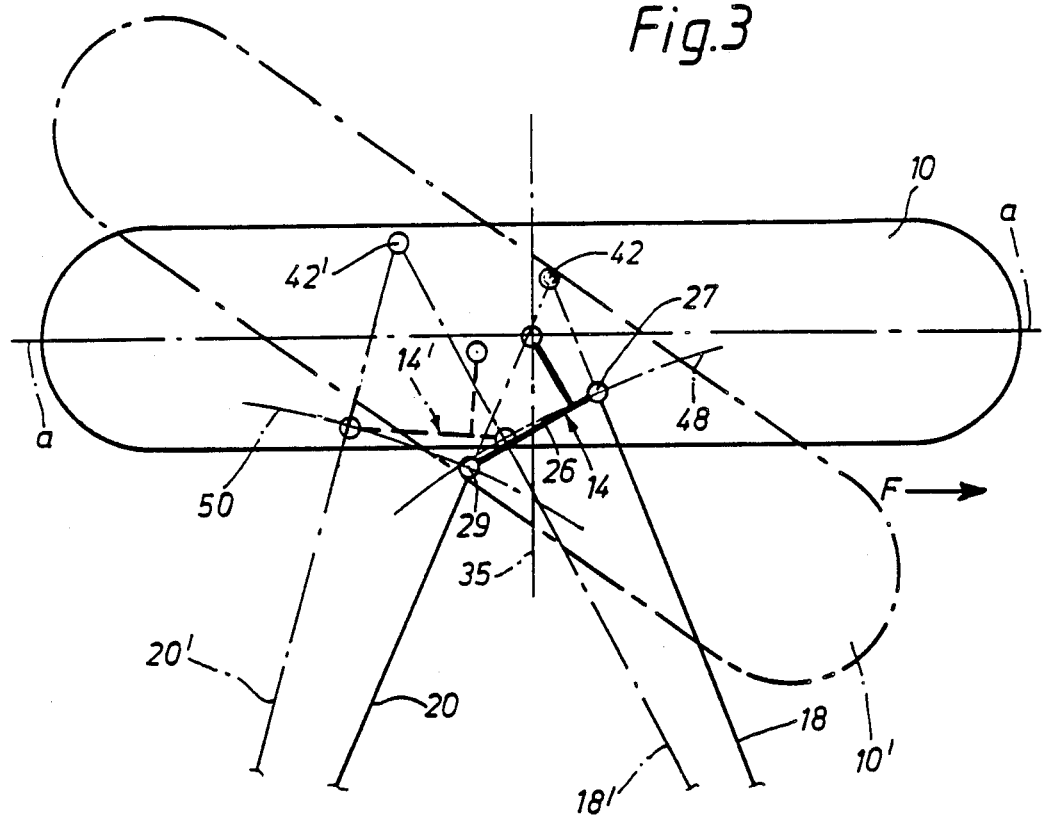

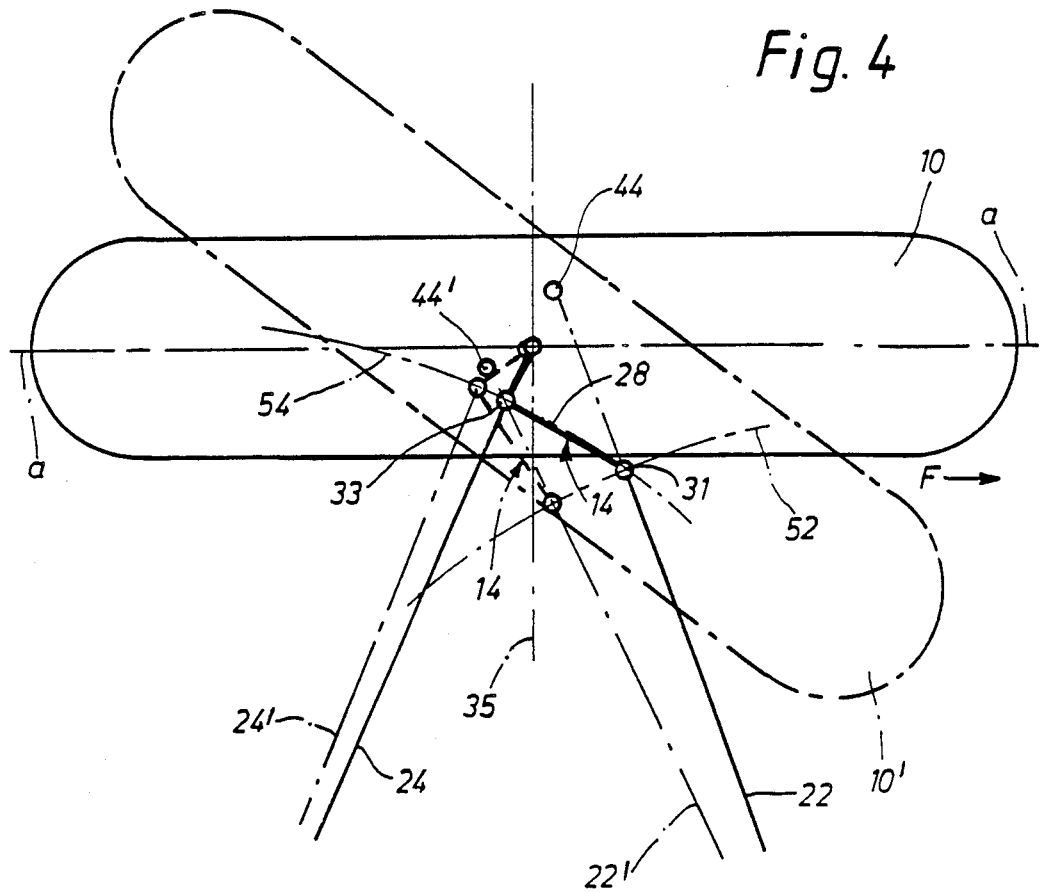

INDEPENDENT WHEEL SUSPENSION FOR STEERABLE WHEELS OF MOTOR VEHICLES

BACKGROUND AND SUMMARY OF THE INVENTION

The invention relates to an independent wheel suspension for steerable wheels of motor vehicles having a wheel bearer connected to the vehicle body by upper and lower guide wheel members.

An independent wheel suspension for steerable wheels is shown in German Examined patent application No. 1,938,850, FIG. 7, in which the wheel can be swivelled about an ideal steering axis for executing steering movements. The ideal steering axis is an intersection of two planes, each defined by an articulation point on the wheel bearer and the axes of two sets of independent guide links. When viewed from the top and from a straight-ahead travel position, the two guide links of each set are angled inward towards each other and the wheel bearer, and are connected in articulated manner to both the vehicle body and the upper wheel bearer forming a coupler. In this wheel suspension, the upper guide links, during steering and spring deflection movements of the wheel, execute cardanic movements about their body-side articulation points.

Based on the design principle of this above-mentioned wheel suspension, an independent wheel suspension has been developed and is described in German Unexamined patent application No. 3,138,850 in which, during a turning of the outer wheel in a curve, the ideal steering axis shifts towards the rear in its upper area with respect to the travel direction.

The tilting of the steering axis resulting during wheel turning is achieved by a special spatial arrangement of the two upper guide links. With respect to a plan view, the line of symmetry of the guide links, in straight-ahead travel position of the wheel, encloses an acute angle with the wheel axis and, in the travel direction, is located behind the wheel axis.

As a result of this tilting of the steering axis, the castor angle, held to zero in this wheel suspension in the straight-ahead travel position of the wheels, increases at the outer wheel in a curve. The consequently increasing castor distance ensures a good return movement of the steering.

However, for spatial reasons or because of other design specifications, it is not always possible to orient the guide links towards the rear, as in the above-reference, to such an extent that the desired effect of increasing the castor distance at the outer wheel in a curve is realized to a desired extent. Further, such a measure is not always in accord with other demands made on a wheel suspension.

It is therefore an object of the present invention to provide a wheel suspension that enables the castor distance to be increased at the wheel in a curve during wheel turning, while maintaining a specified basic arrangement for the guide links.

This and other objects are achieved by the present invention by providing a first upper guide wheel member comprising first guide links connected at articulated points to the vehicle body and the wheel bearer, and a first coupler connected between the articulated points at the wheel bearer. The first coupler is angled rearwardly from the wheel and inwardly toward said vehicle.

In a preferred embodiment of the present invention, the first coupler transverses a bisector of the angle formed by the first guide links. This angled position of the first coupler to the angle bisector of the angle formed by the guide links causes the first ideal guide articulation, defined as the connecting lines of the articulations of the two first guide links, to be displaced rearward relative to the wheel against the travel direction during the course of a wheel turning at the outer wheel in a curve. At the same time, a desired wheel camber can be achieved since the first guide articulation moves closer towards the wheel central-longitudinal plane during the course of a wheel turning.

The displacement of the ideal first guide articulation brings about the desired tilting and, if necessary, spreading of the steering axis. The required displacement of the ideal first guide articulation is achieved by the angled position of the coupler to the angle bisector in conjunction with the first guide links converging in the direction of the wheel bearer.

At the same time, the spatial arrangement of the first guide links and their longitudinal dimensions can be selected in accordance with design regulations, such that the guide links can lie in a common plane or in a skewed position relative to one another.

In a preferred embodiment of the present invention, the second lower wheel guide member is made as a triangular guide link which is connected in articulated manner to the wheel bearer via a universal joint. The second wheel member comprises two individual guide links and a second coupler which is angled forwardly and inwardly from the wheel. The advantageous result is that the second ideal guide articulation, defined as the connecting line of the articulations of the two second guide links, is displaced in a direction during wheel turning which is opposite to that of the first guide articulation and thus enables the castor distance to be optimally set.

In a preferred embodiment of the invention, the second coupler is shorter than the first coupler, as a result of which the second guide articulation, during steering movements, is displaced less than the first guide articulation.

Further objects, features, and advantages of the present invention will become more apparent from the following description when taken with the accompanying drawings, which show for purposes of illustration only, an embodiment constructed in accordance with the present invention.

BRIEF DESCRIPTION OF THE DRAWINGS

FIG. 1 is a plan view of a wheel suspension constructed in accordance with a preferred embodiment of the present invention;

FIG. 2 shows the embodiment of FIG. 1, viewed from the rear of the vehicle;

FIG. 3 is a schematic plan view of the wheel suspension of FIG. 1, the wheel being shown in the straight-ahead travel position and at maximum degree of wheel turning;

FIG. 4 is a plan view similar to FIG. 3, showing the embodiment of FIG. 1, illustrating the movement of the second coupler.

DETAILED DESCRIPTION OF THE DRAWINGS

Figure 3A:
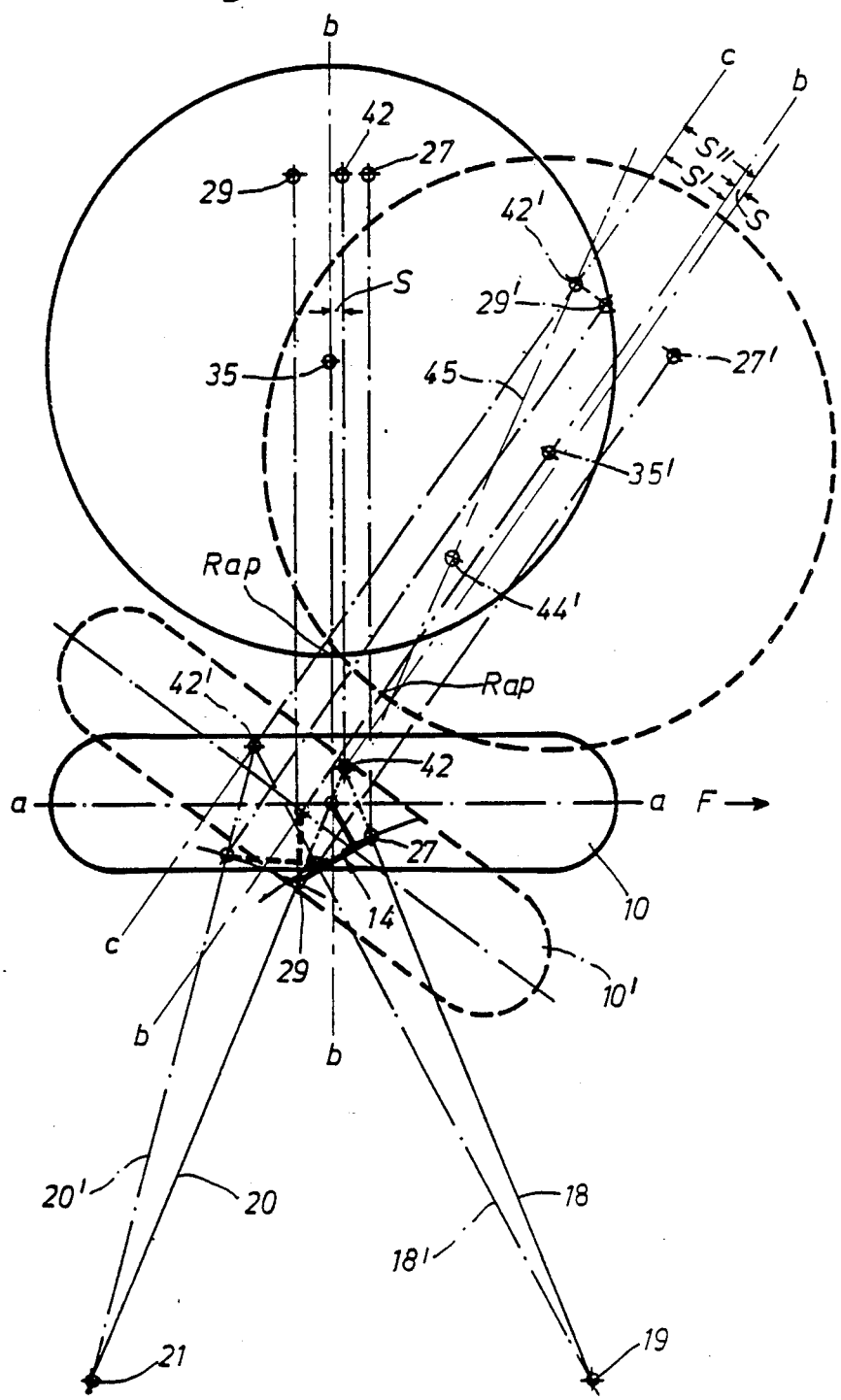
FIG. 3a shows the embodiment of FIG. 1 in the position illustrated in FIG. 3 and with wheel projections, corresponding to the wheel positions shown in FIG. 3, onto a plane disposed perpendicularly to the wheel axis.

With reference to FIG. 1, a steerable wheel of a passenger car is designated as 10. It is mounted on a wheel bearer 14 equipped with a steering arm 12. A track rod 16 of a steering device is articulated on the steering arm 12.

The wheel 10 and the wheel bearer 14 are guided by means of upper and lower wheel guide members which are each formed by a pair of guide links.

The upper guide links are designated as 18 and 20, and the lower guide links are designated as 22 and 24. Their respective body-side articulations 19, 21 and 23, 25 and their respective wheel-bearer-side articulations 27, 29 and 31, 33 enable the guide links 18, 20 and 22, 24 to execute cardanic movements during spring deflection and steering movements of the wheel 10.

As shown in FIG. 1, the guide links of 18, 20 and 22, 24 of each guide link pair, in the straight-ahead travel position of the wheel 10, angle towards one another in the direction of the wheel bearer 14. Separate couplers 26 and 28 are located between the wheel bearer upper articulations 27 and 29 and the lower articulations 31 and 33 respectively. The couplers 26 and 28 extend across the bisectors 30 and 32 respectively of the two angles enclosed by the two guide link pairs which are articulated on the couplers 26 and 28. These couplers 26 and 28 are only shown in dash-dotted lines in FIG. 1, because the wheel-bearer articulations 27, 29 and 31, 33 of the guide link pairs 18, 20 and 22, 24 respectively, are provided on corresponding legs of the wheel bearer 14 as seen in FIG. 2.

In the embodiment illustrated in FIG. 1, the angle bisector 30 between the upper guide links 18 and 20 coincides in plan view with the wheel axis 35. However, in contemplated embodiments of the present invention, the upper guide links 18 and 20 can be oriented to the wheel axis 35 such that the angle bisector 30 or the line of symmetry of the upper guide links, 18, 20 together with the wheel axis 35, define an acute angle which, in the travel direction F, is located in front of or behind the wheel axis 35 and opens inwards towards the vehicle.

As shown in FIG. 1, the upper coupler 26 runs towards the angle bisector 30 and inwards at an angle towards the rear against the travel direction F. In contrast, the lower coupler 28 runs inwards at an angle towards the front in the travel direction F. In the preferred embodiment illustrated in FIG. 1, the lower coupler 28 is shorter than the upper coupler 26 and is located in front of the wheel axis 35 in the travel direction F, whereas the upper coupler 26 crosses the wheel axis 35. However, the lower coupler 29 could also be located behind or cross the wheel axis 35 as provided in further contemplated embodiments. The upper coupler 26 could also be located to the side of the wheel axis 35.

The length of the lower guide links 22 and 24 is greater than that of the lower guide links 18 and 20 in the embodiment illustrated in FIG. 1. The body-side articulations 19 and 21 of the upper guide links 18, 20 are located a smaller lateral distance from the wheel central plane a—a than the corresponding body-side articulations 23 and 25 of the lower guide links 22 and 24. The length of the guide links, their setting and mutual spatial allocation, and the lateral distance of the couplers 26 and 28 from the wheel central-longitudinal plane a—a depends on the type of wheel suspension or on how the steering axis is to be spatially located. In the embodiment of the wheel suspension illustrated in FIGS. 1 and 2, for example, the guide link arrangement is arranged such that the upper coupler 26 is located at a greater lateral distance from the wheel central-longitudinal plane a—a than the lower coupler 28, as noted above.

The lines 34 and 36 connect the body-side articulations 19, 21 and the wheel bearer articulations 27, 29 respectively, of the upper guide links 18 and 20. Lines 38 and 40 connect body-side articulations 23, 25 and the wheel bearer articulations, 31, 33 respectively, of the lower guide links 22 and 24. Lines 34 and 36 intersect at 42, and lines 38 and 40 intersect at 44, because the respective individual guide links of each pair of guide links are located in a common plane. For purposes of illustration, however, the individual guide links of each pair have been vertically offset relative to one another in FIG. 2. The point of intersection 42 represents an ideal upper guide articulation while the point of intersection 44 represents an ideal lower guide articulation of the wheel bearer 14. The line connecting these two guide articulations 42 and 44 is the ideal steering axis of the wheel 10.

However, the two points of intersection 42 and 44 cannot be represented graphically if the individual guide links 18, 20 and 22, 24 of the two guide link pairs are arranged skewed to one another, as provided in a contemplated embodiment. In this case, the ideal steering axis has to be determined mathematically, with each desired spatial position of the ideal steering axis being possible.

As shown in FIGS. 3 and 3a and 4 and 4a, and as explained below, the ideal guide articulations 42 and 44, which define the steering axis of the wheel, are displaced during wheel turning for achieving a desired wheel castor.

In the straight-ahead travel position of the wheel 10, shown in solid lines in FIGS. 3, 3a, 4 and 4a, the two ideal guide articulations 42 and 44 are located, in the illustrated embodiment, on the side of the wheel central-longitudinal plane a—a which faces away from the vehicle body. Viewed from the rear of the vehicle, the ideal guide articulations 42, 44 are located a distance S behind a vertical plane b—b which contains the wheel axis 35 and the wheel contact point Rap. The guide links 19, 20, 22 and 24, in this design position, are essentially in a horizontal position.

During the course of a wheel turning, the wheel bearer articulations 27 and 29 of the upper coupler 25 are each displaced along circular track curves 48 and 50 (FIG. 3) respectively, while the wheel bearer articulations 31 and 33 of the lower coupler 28 are displaced along circular track curves 52 and 54 (FIG. 4). The center points of these curves are the body-side articulation points 19, 21 and 23, 25 respectively.

During a wheel turning, the two ideal guide articulations 42 and 44 are displaced such that when the wheel, as shown in dotted lines, is at maximum degree of turning, they are located at a distance S' from the vertical plane b—b. In this position, they are designated in FIGS. 3, 3a, 4 and 4a as 42' and 44'. It can be seen from FIGS. 3a and 4a that both ideal guide articulations 42' and 44' have been displaced during the wheel turning such that, as viewed from the rear of the vehicle, they are located in a vertical plane c—c in front of the wheel axis 35. Thus, the articulations 42' and 44' have been displaced by an overall distance S" opposite the travel direction F. In this position of the ideal guide articulations 42 and 44, the guide links shown in dash-dotted lines are designated as 18',20',22' and 24'.

As a result of the displacement of the ideal guide articulations 42 and 44 during a wheel turning, the steering axis tilts forwards and downwards at an angle in the travel direction towards the roadway plane. The distance of the point penetrating through the roadway plane from the wheel contact point and the castor angle of the steering axis can be determined as a function of the length of the two couplers 26 and 28 and their positioning with respect to one another.

Figure 4A:
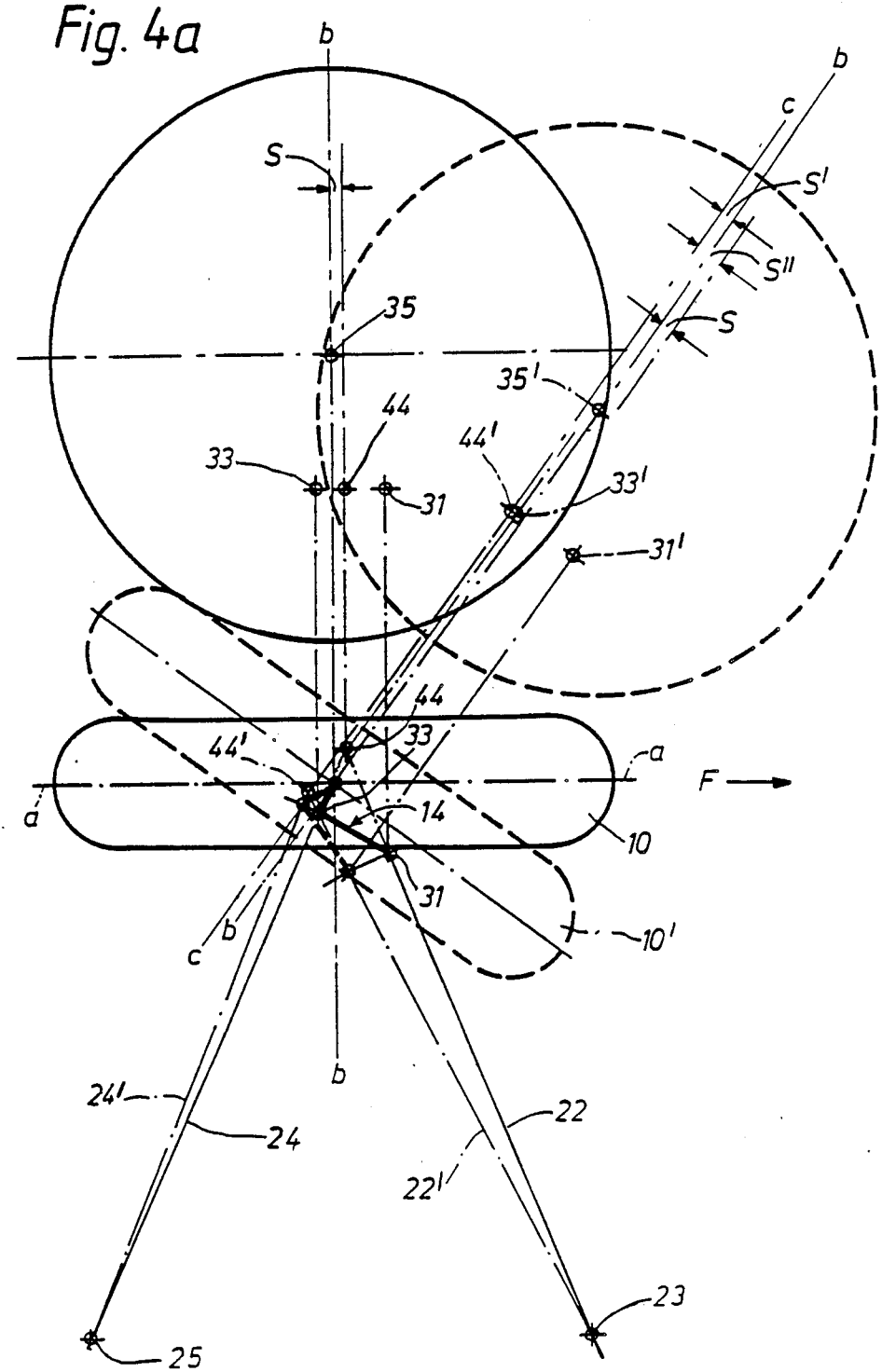
FIG. 4a is a view similar to FIG. 3a and illustrates the displacement of the second ideal guide articulation.

To show the direction of the tilted steering axis 45 when the wheel 10 is at maximum degree of turning, the displaced lower ideal guide articulation 44' shown in FIG. 4a has been drawn in FIG. 3a. It can be recognized from a comparison of FIGS. 3 and 4 that the two ideal guide articulations 42 and 44 in this embodiment of the wheel suspension are located essentially above one another when the wheel 10 is in the straight-ahead travel position, and accordingly, the steering axis 45 is disposed upright when the wheel 10 is in this position.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Independent wheel suspension for steerable wheels having a wheel bearer connected to the vehicle body by upper and lower guide wheel means, wherein said upper guide wheel means comprises separate upper guide link means coupled at articulated points to the vehicle body and the wheel bearer; and an upper coupler means connected between the wheel bearer articulated points and angled rearwardly and inwardly from said wheel, and wherein said lower guide wheel means comprises separate lower guide link means coupled at articulated points to the vehicle body and the wheel bearer; and a lower coupler means connected between the wheel bearer articulated points and angled forwardly and inwardly from the wheel.

2. The suspension of claim 1, wherein the lower coupler means is shorter than the upper coupler means.

3. The suspension of claim 1, wherein said separate guide links for said upper guide link wheel means and said lower guide wheel means angle inward to said wheel bearer.

4. The suspension of claim 3, wherein said upper coupler means tranverses a bisector of an angle formed by said upper guide link wheel means.

5. The suspension of claim 3, wherein the lower coupler means is shorter than the upper coupler means.

* * * * *